Patented Aug. 14, 1951

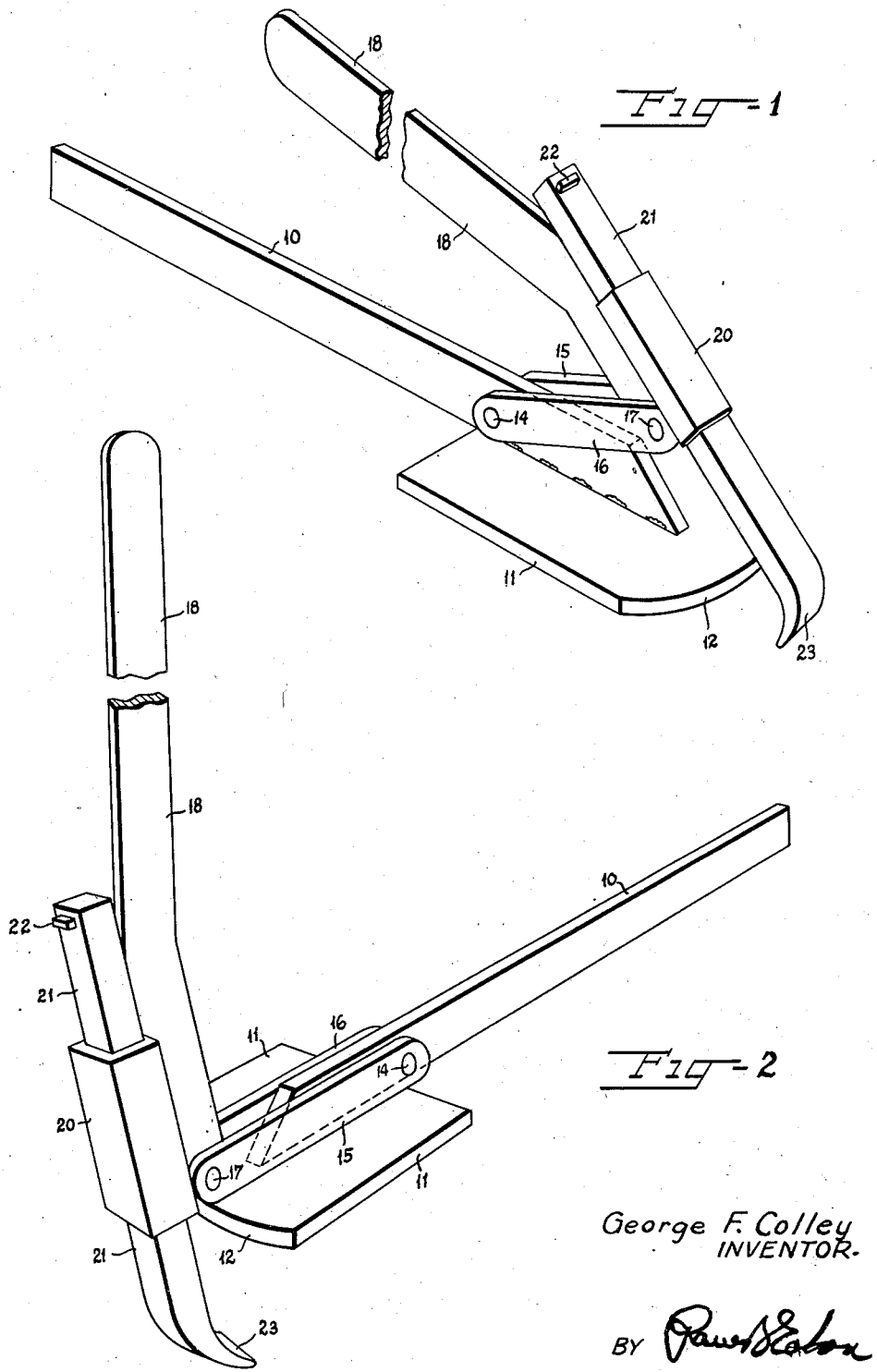

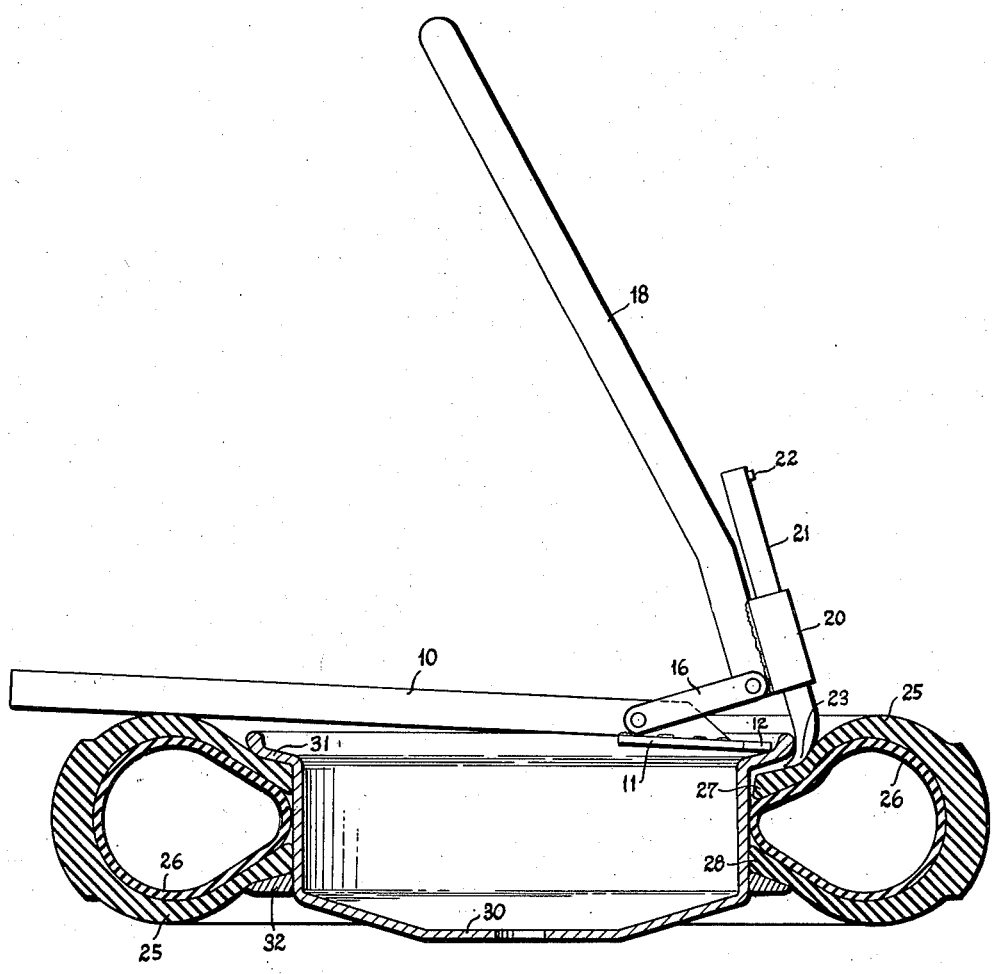

2,563,987

UNITED STATES PATENT OFFICE 2,563,987

TOOL FOR SEPARATING THE BEAD OF A TIRE FROM A RIM FLANGE

George F. Colley, Augusta, Ga., assignor to Kent A. Hill, Athens, Ga.

Application December 20, 1946, Serial No. 717,402

1 Claim. (Cl. 157—1.17)

This invention relates to a tire tool and more specifically to a tire tool especially useful in the removal of pneumatic casing from truck wheels. Very often it happens that the large tires on trucks become cemented to the rim on account of corrosion and the like, and it is very difficult to separate the beads from the rims due to the rigidity of the casing. I have devised a simple tool comprising a member adapted to have one end resting on the casing and its other end supported by the exterior of the flange of the wheel, and having a lever pivotally secured to the first-named member, and said lever having a slidable dog thereon which can be adjusted longitudinally of the lever to regulate its depth of penetration between the flange of the rim and the bead of the tire, and when the lever is moved upwardly relative to the member disposed on the flange of the rim and on the tire casing, the bead of the tire casing will be removed from the inner surface of the flange of the rim and then the tool can be moved around to another position until all portions of the tire casing have been removed from the flange of the rim.

It is, therefore, an object of this invention to provide a tire tool having a member adapted to be supported by a wheel and tire and having another member pivotally connected thereto, and provided with a slidable dog for passing between the rim of the wheel and the bead of the tire for separating the tire from the rim.

Some of the objects of the invention having been stated, other objects will appear as the description proceeds when taken in connection with the accompanying drawings, in which Figure 1 is an isometric view of the tire tool showing it in the position it would occupy when ready to be placed on a tire and wheel;

Figure 2 is another isometric view but showing the position of parts after the tool has been operated to separate the bead of a tire from its rim;

Figure 3 is a cross-sectional view of a tire and wheel and showing the tool in position after having been operated to separate the bead of a tire from its associated rim.

Referring more specifically to the drawings, the numeral 10 indicates a suitable bar having a plate 11 welded to one end thereof and which is suitably rounded as at 12 to conform to the curvature of the rim portion of a wheel, or the rim in case the rim is separate from the wheel. Pivotally secured as at 14 on an intermediate portion of the bar 10 is a pair of links 15 and 16 which are pivotally secured as at 17 to one end of a lever 18. This lever 18 has a tubular member 20 which is rectangular in cross sections and in which is slidably mounted a dog 21 having a stop 22 at one end thereof to prevent its falling out of the tubular member 20, and having an inturned sharpened end 23 to pass between the rim and the bead of a tire disposed thereon. The dog 21 can be struck with a hammer to separate the bead of the casing from the rim.

The pneumatic tire is conventional and is indicated by reference character 25 and it has a conventional inner tube 26 on the interior thereof. The two beads of the tire are indicated as at 27 and 28 and the wheel is indicated at 30 and in some types of wheel there is a rim or flange 31 on one side and a lock ring 32 on the other side which is removable before a casing can be removed from the wheel. It, too, could likewise be equally used with a wheel or rim having flanges 31 on both sides thereof instead of having a locking ring 32.

In any event, the portion 10 of the tool is placed as shown in Figure 3 and the plate 11 with rounded portion 12 fitting against the exterior of the flange on the wheel or rim and then the operator usually stands on the portion 10 and with the parts in substantially the position shown in Figure 1, the upper end of the dog 21 is struck with a hammer to cause its nose portion 23 to transmit sudden impacts to the side of the tire casing to separate the bead of the tire from the rim and then the lever 18 is raised upwardly to the position shown in Figure 3 and the curved portion 23 is forced down between the rim portion 31 and the bead 27 of the pneumatic casing 25 to thus further separate the bead of the casing from its associated rim. This can be repeated around the tire as often as necessary until the tire is ready for removal from the wheel or rim.

In the drawings and specification there has been set forth a preferred embodiment of the invention and all those specific terms are employed, they are used in a generic and descriptive sense only, and not for purposes of limitation, the scope of invention being defined in the claim.

I claim:

A tire tool for removing the bead portion of a pneumatic casing from the flanges of a rim, wheel, and the like, comprising a base member adapted to be supported by the casing at one end and having a plate provided with an arcuate outer edge secured to its other end adapted to lie flush against the exterior of the flange portion of the wheel or rim, said member having pivoted thereto immediately above said plate one end of a link and the other end of the link having pivoted thereto the extreme lower end of a lever, the lower end of the lever having a tubular guide member secured thereto, a dog slidably mounted in said guide and having an inturned nose portion adapted to be forced between the bead of the casing and the rim to separate the bead from the rim.

GEORGE F. X COLLEY.
his mark

Witnesses to mark:
C. P. McALPINE,
ROBERT V. BRADLEY.

REFERENCES CITED

The following references are of record in the file of this patent:

UNITED STATES PATENTS

| Number | Name | Date |
|---|---|---|
| 1,452,596 | De Fernelmont | Apr. 24, 1923 |
| 1,475,519 | Snider | Nov. 27, 1923 |
| 2,293,467 | Kenworthy | Aug. 18, 1942 |
| 2,314,127 | Colley et al. | Mar. 16, 1943 |
| 2,319,155 | Passanante et al. | May 11, 1943 |
| 2,367,638 | McCulloch | Jan. 16, 1945 |
| 2,495,117 | McCollister | Jan. 17, 1950 |